United States Patent

[11] 3,621,216

[72] Inventor Donald Wortzman
  Mahopac, N.Y.
[21] Appl. No. 843,278
[22] Filed June 30, 1969
[45] Patented Nov. 16, 1971
[73] Assignee International Business Machines
  Corporation
  Armonk, N.Y.
  Continuation-in-part of application Ser. No.
  791,365, Jan. 15, 1969, now abandoned.

[54] LINEAR INTERPOLATOR
  19 Claims, 5 Drawing Figs.
[52] U.S. Cl. ........................................................235/151.11,
  235/152, 318/573
[51] Int. Cl. ................................................... G06f 7/38,
  G06f 15/46

[50] Field of Search............................................ 340/172.5,
  172.5 R, 173; 235/151.11, 152 IE

[56] References Cited
  UNITED STATES PATENTS
  3,153,224 10/1964 Taylor, Jr. .................... 340/172.5
  3,254,203 5/1966 Kveim .......................... 235/151.11
  OTHER REFERENCES
  " Sampled Data Control with Table Lookup Interpolation"
  IBM Technical Disclosure Bulletin Vol. No. 12 235/151 IE

*Primary Examiner*—Eugene G. Botz
*Attorneys*—Hanifin and Jancin and Edward S. Gershuny ABSTRACT: A system for interpolating data to generate a stream of pulses for controlling a machine tool or other precise mechanism. The interpolation is broken into a high-speed portion and a low speed portion. For a given straight line cut, the high-speed portion contains a fixed part and a variable part. The variable part of the high-speed portion is supplied by the low speed portion.

PATENTED NOV 16 1971 3,621,216

INVENTOR
DONALD WORTZMAN

BY Edward S. Hershkuny

ATTORNEY

* OR OTHER PREDETERMINED NUMBER

LINEAR INTERPOLATOR

INTRODUCTION

This application is a continuation-in-part of application Ser. No. 791,365 filed Jan. 15, 1969, now abandoned. This invention relates to the control of machine tools or other precise mechanisms and, more particularly, to a system for interpolating data to generate pulse streams for controlling the axes of one or more machine tools.

DESCRIPTION OF PRIOR ART

It is well known to supply position information to the controls for each axis of a machine tool in the form of two square waves. One of the square waves is a reference signal having a predetermined frequency, and the other square wave is a command-position signal which has a changing phase displacement relative to the reference signal. The changes in this phase displacement are related to the relative motion desired between the workpiece and the cutting head of the machine tool. The machine tool contains for each axis a phase discriminator, a resolver (position sensor), amplifiers, wave shapers and means for moving the workpiece or the cutting head. All axes of the system respond simultaneously to the difference in phase between a position-indicating feedback signal and the appropriate command-position signal to effect movement along a desired path.

The reference signal establishes basic timing for all axes of the machine tool and is fed to each axis position sensor to generate the feedback signal. The reference signal is typically obtained by monitoring the high-order trigger of a reference counter which is fed by a free-running reference oscillator. The reference signal will have a frequency that is equal to the frequency of the reference oscillator divided by the number of count conditions of the reference counter. For each axis of the machine tool there is an axis position counter which also receives an input from the reference oscillator. Additional inputs to each axis position counter are commonly supplied by a linear interpolator. These additional inputs comprise pulse streams containing distance information and pulses containing direction information. Depending upon the direction of motion that is desired, the distance information pulses will either be added to or subtracted from the axis position counter. The command-position signal is obtained by monitoring the high-order trigger of the axis position counter.

One function of the interpolation unit is that of ensuring that pulses generated on one axis which is to move a shorter distance than another axis are equally spaced so that the motion is continuous and follows a straight line to the desired position. To accomplish this, all of the pulses generated on the shorter axis must be spread out so that they occur over the same time interval as the pulse generated in the longer axis.

A prior art interpolator which accomplishes the above typically includes one register and one accumulator for each axis of the machine tool. All of the registers and accumulators will generally be of the same size. If we assume that each pulse supplied to an axis of the machine tool produces a movement of 0.1 mil and that the tool can operate at a maximum velocity of 1 inch per second, then the interpolator must be capable of generating 10,000 pulses per second for each axis. In such a system, each of the aforementioned registers and accumulators will generally be of such a size as to handle a number consisting of four decimal digits.

Assume that a two-dimensional cut is to be made and that the X-axis is to move a distance of 0.7346 inches while the Y-axis moves a distance of 0.2803 inches. The number 7346 is placed in the register associated with the X-axis of the machine tool, the number 2803 is placed in the register associated with the Y-axis of the machine tool and each of the accumulators is set to zero. Then, under control of a single clock, the contents of each of the registers is added to its associated accumulator 10,000 times. After the additions are complete, the X-accumulator will have overflowed 7346 times and the Y-accumulator will have overflowed 2803 times. The overflow from each accumulator will be used to control the gating of a pulse to the appropriate axis position counter of the machine tool. This will cause the machine tool to cut a piece in a manner that is a very close approximation to a straight-line segment having the appropriate slope and distance.

The above brief description points out some of the reasons that a high-speed interpolator is required in the prior art. If a general purpose computer were to be used as the interpolator for a two-axis numerically controlled machine tool, it would have to perform 20,000 additions per second. Since the computer would, at all times, have to keep track of which axis it was working on, how much of the cut had already been made, and various other "housekeeping" functions, it would be reasonable to expect that approximately five or six programming steps would need to be performed for each addition step. This would result in an excess of 100,000 programming steps per second which would need to be performed by the computer. Thus, it can readily be seen that, using the prior art approach, a single general purpose computer could perform interpolations for a very small number of multiaxis numerically controlled machines even if the computer were not being used for any other task.

A copending application for DATA INTERPOLATION FOR COMPUTER CONTROL OF MACHINE TOOLS, Ser. No. 776,948 filed Nov. 19, 1968, now U.S. Pat. No. 3,564,595, by A. R. De Florio and D. Wortzman and assigned to the same assignee as this application discloses means for alleviating many of the disadvantages of the prior art by dividing the interpolation into two parts. The two parts of the interpolation are a high-speed part and a low-speed part. The high-order portion of a number which represents the amount of motion that one axis is to move in a given amount of time is repetitively added to itself in a high-speed unit at a first rate which is proportional to the maximum feed rate of the machine tool. The low-order portion of the number is repetitively added to itself at a second rate which is lower than the first rate. Each time that an overflow from the high-speed accumulator is detected, a pulse will be generated to cause one increment of motion of the appropriate axis of the machine tool. The number which is added to the high-speed accumulator is determined by the presence or absence of an overflow from the low-speed accumulator. The disclosure of the said application, Ser. NO. 776,948 is hereby incorporated herein by this reference.

SUMMARY OF THE INVENTION

The above and other disadvantages of the prior art are overcome in accordance with one aspect of this invention by providing means for generating a plurality of interpolation tables and by providing means whereby the various tables may be used to alter one another. A first table is generated with entries indicating the occurrence or nonoccurrence of overflows which would result from repetitively adding to itself the high-order portion of a number representing desired displacement. One or more additional tables are generated with entries representing the occurrence or nonoccurrence of overflows which would be realized by repetitively adding to itself (or themselves) low-order portions(s) of the number representing desired displacement. The high-order table contains a fixed portion and a variable portion. After all of the entries in the high-order table have been utilized in the generation of pulses to be sent to the machine tool, the variable portion will be altered in accordance with entries in the next low-order table. When a plurality of low-order tables are used, all but the lowest-order table will also have a fixed portion and a variable portion. The variable portion of each table will periodically be updated by entries contained in the next lower-order table.

In an alternative embodiment of the invention, one fixed table is used. The table is arranged in such a manner that pulse streams containing any desired number of pulses may be obtained from it by combining one or more portions of the table. The desired combinations are obtained through the use of masks, there being a high-order mask and at least one low-order mask for each machine tool axis that is associated with the table. If two masks are used and the table contains $n$ entries, it will be completely read out, at all times under control of one or the other of the masks, ($n+1$), times. After $n$ consecutive table entries have been read out (note that the first table entry "consecutively" follows the last table entry) under control of the high-order mask, the next table entry will be read out under control of the low-order mask. After the entire table has been read out ($n+1$) times, a number of pulses will have been produced that is equivalent to the number that would have been produced by reading the table $n$ times under control of the high-order mask and reading it once under control of the low-order mask.

The most significant advantages of this invention are its reduced cost and reduced complexity. Once generated, a set of tables or masks will contain all of the information necessary for the apparatus to generate a complete train of linear interpolation pulses that are related to the input displacement data. Once the tables or masks have been generated, the data which describes each pulse stream can be read out quickly by relatively simple and inexpensive apparatus.

One feature of this invention is that the tables or masks for a given straight-line cut can be generated during the time that pulse data for a previous straight-line cut are being read out. This overlapped operation will generally allow ample time for generation of the tables or masks while permitting machine tool travel at is maximum travel velocity.

Another advantage of the embodiment of the invention which uses masks is that the time required to generate a mask is insignificant when compared with prior interpolation techniques. Since each mask is essentially a binary representation of the input data, the mask will be available in a binary computer without the need for any data manipulation.

The foregoing and other objects, features and advantages of the invention will be apparent from the following more particular description of preferred embodiments of the invention, as illustrated in the accompanying drawings.

ENVIRONMENTAL SYSTEM

Figure 1:
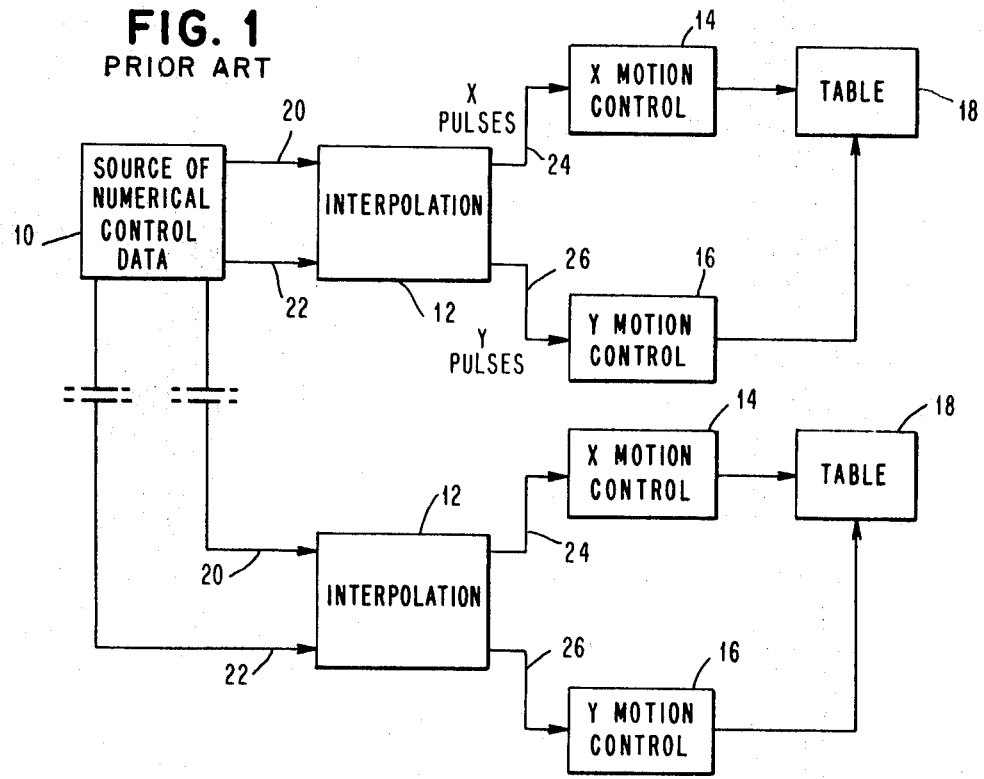
FIG. 1 is a general block diagram of a machine tool system wherein this invention may be used.

Referring to FIG. 1, a numerical control system is comprised of a source of numerical control data 10 which may be a general purpose computer; an interpolation unit 12 for each of the machine tools in the system; X-motion control apparatus 14 for each tool; Y-motion control apparatus 16 for each tool; and one or more tables or machine tools 18 each of which is moved in accordance with the numerical control data. (For a machine having more than two axes of motion, there would also be motion control apparatus for each additional axis.)

The apparatus 10 supplies positioning information for the X-axis of each machine along output line 20 and positioning information for the Y-axis of each machine along output lines 22 to the interpolation unit 12. One channel (not shown) of the computer will generally be used as the interface between each interpolation unit and the central processing unit (CPU) of the computer. Each interpolation unit generates pulses for the X-axis on an output line 24 and pulses for the Y-axis on output line 26. These pulses energize the X-motion control and Y-motion control respectively, which convert the pulses to an analog signal which moves the table an incremental distance for each pulse received.

It will be recognized by those skilled in the art that the schematic diagram of FIG. 1 is a vastly simplified illustration of the basic components of a numerically controlled machine tool system. However, the many details of such a system are now well-known in the art and need not be described in detail herein. For various other details of such a system, reference is made to copending Pat. application, Ser. NO. 787,643 filed on Dec. 30, 1968 by J.G. Brenza for MACHINE TOOL CONTROL SYSTEM and assigned to the same assignee as this application. The disclosure of said copending application is incorporated herein by this reference.

Utilizing the apparatus of copending application, Ser. NO. 776,948, the number 7346 would be interpolated as follows: segment the number 7346 into a high-order portion (7) and a low-order portion (346). If the high-order portion of the number is added to itself 10,000 times, and the result of each addition is stored in a one-digit accumulator, the accumulator will overflow exactly 7,000 times. The pattern of overflow pulses will be repetitive in nature, repeating itself after each 10 additions. In other words, the stream of 7,000 overflow pulses will consist of 1,000 smaller pulse streams each of which has seven pulses within it. It can be seen that the desired stream of 7346 pulses could be constructed by combining streams containing seven pulses with stream containing eight pulses. In this case, it is clear that 346 eight-pulse streams and 654 seven-pulse streams would be required in order to produce the desired 7346 pulses. In order to maintain reasonable uniformity of pulse spacing, it is necessary for the eight-pulse streams to be intermixed in a uniform manner with the seven-pulse streams. This is accomplished by using two accumulators; a high-speed one-digit accumulator into which the number "7" is repetitively added at a rate of 10,000 additions per second, and a relatively low-speed three-digit accumulator into which the number "346" is added at a rate of 1,000 additions per second. Each time that an addition into the three-digit accumulator results in an overflow, the digit "8" will be used in the next ten additions into the one-digit accumulator. Each time that an addition into the three-digit accumulator does not result in an overflow, the digit "7" will be utilized in the next ten additions into the one-digit accumulator. After 10,000 additions into the one-digit high-speed accumulator (and 1,000 additions into the low-speed three-digit accumulator), there will have been 7,346 overflows from the high-speed one-digit accumulator resulting in the desired stream of 7,346 pulses.

In the system described above, the seven-pulse streams and the eight-pulse streams would normally have been generated by repetitive addition into a one-digit accumulator. Table I shows the accumulator contents and the present or absence of an overflow for each of the ten steps in generating a seven-pulse stream and an eight-pulse stream.

TABLE I

| Step | Seven-stream | | Eight-stream | |
|---|---|---|---|---|
| | Accumulator contents | Overflow | Accumulator contents | Overflow |
| 1 | 7 | 0 | 8 | 0 |
| 2 | 4 | 1 | 6 | 1 |
| 3 | 1 | 1 | 4 | 1 |
| 4 | 8 | 0 | 2 | 1 |
| 5 | 5 | 1 | 0 | 1 |
| 6 | 2 | 1 | 8 | 0 |
| 7 | 9 | 0 | 6 | 1 |
| 8 | 6 | 1 | 4 | 1 |
| 9 | 3 | 1 | 2 | 1 |
| 10 | 0 | 1 | 0 | 1 |

As may be seen from the table, the seven-pulse stream contains seven overflow pulses (1's) distributed in a reasonably uniform manner throughout the 10 intervals and the eight-pulse stream contains eight overflow pulses (1's) distributed in a reasonably uniform manner throughout the 10 intervals. Note that the first entry in each of the "overflow" columns of table I is a zero. Since the number being repetitively added will contain no more digits than the capacity of the accumulator, the first addition will never result in an overflow. For this reason, a stream of eight pulses could be generated directly from a stream of seven pulses by changing the first zero in the seven-pulse stream to a one. Such a stream (designated the 8'-stream) is shown in table II along with a seven-stream and an eight-stream.

TABLE II

| | | | | | | | | | |
|---|---|---|---|---|---|---|---|---|---|
| 7-stream | 0 | 1 | 1 | 0 | 1 | 1 | 0 | 1 | 1 |
| 8-stream | 0 | 1 | 1 | 1 | 1 | 0 | 1 | 1 | 1 |
| 8'-stream | 1 | 1 | 1 | 0 | 1 | 1 | 0 | 1 | 1 |

It will be noted that the 8'-pulse stream is quite close to the 8-stream that would be generated by repetitive addition of the digit 8 into a one-digit accumulator. If, at any given point in the pulse stream, a comparison is made between the number of pulses already contained in the 8-stream and in the 8-stream, it will be seen that the difference is never greater than one. Also, this will be true for a comparison between any pulse stream generated by repetitive addition and a pulse stream that is generated by changing the first zero in the next lower pulse stream to a one. Because a difference of one pulse (corresponding to a single unit of motion of an axis of the machine tool) at any given time is well within commonly accepted tolerances, the 8'-pulse stream will generally be a perfectly acceptable approximation to an 8-pulse stream that is generated by repetitive addition.

Utilizing the above technique for generating an $(n+1)$-pulse stream from an $n$-pulse stream, permits one to regard each of the small pulse streams as having a fixed portion and a variable portion. The fixed portion comprises all except the first bit of the $n$-pulse stream which would be generated by repetitive addition of the number $n$. The variable portion of the pulse stream is the first bit which will be a "0" whenever an $n$-pulse stream is desired and will be a "1" whenever an $(n+1)$-pulse stream is desired.

Figure 2:
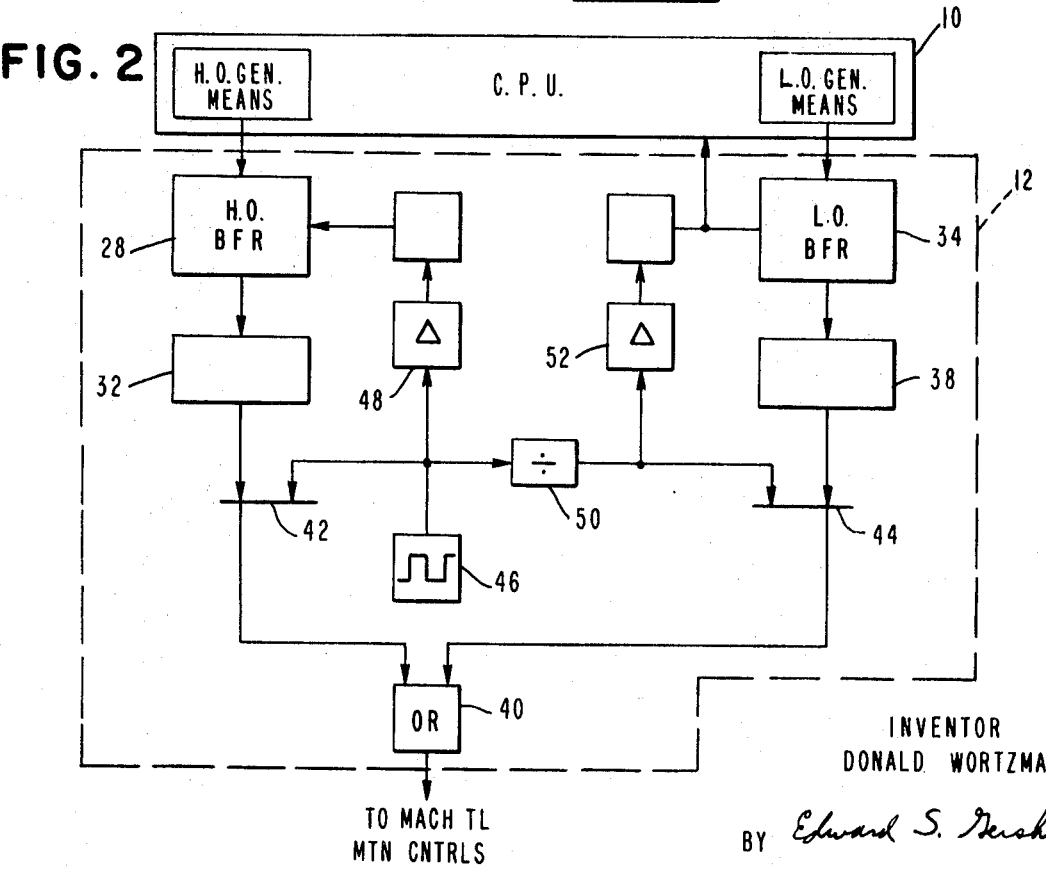
FIG. 2 shows certain details of an interpolator designed in accordance with one aspect of this invention.

Apparatus which operates in accordance with the above description is shown in FIG. 2. The apparatus shown in FIG. 2 comprises a high-order buffer 28 for holding the high-order interpolation table and an associated address counter 30 and output data register 32; a low-order buffer 34 for holding the low-order interpolation table and an associated address counter 36 and output data register 38; an OR circuit 40 the output of which will be connected to the motion control mechanism for the machine tool and the inputs to which come from register 32 and 38 through their respective output gates 42 and 44; a control clock 46 which supplies timing pulses to gate 42, to delay element 48 which feeds the high-order address counter 30, to a frequency divider 50 which feeds gate 44 and to a delay element 52 which feeds low-order address counter 36. Generally, each word in each of the buffers will have two bits specifically related to each axis, [one of the bits supplying distance (overflow) information and the other bit supplying directional (plus or minus) information] and weighting bits which supply information relating to the desired rate of travel of the machine tool. This type of format is well known in the prior art and need not be further described herein. IF the system is implemented in such a manner that the words are not necessarily accessed sequentially, then each word would also include the address of the next word to be accessed.

The following example will more clearly illustrate the operation of the apparatus shown in FIG. 2. Consider the case of a three-axis machine tool. Assume that, for a given straight-line cut, the X-axis is to move 46 units, the Y-axis is to move 83 units and the Z-axis is to move 27 units. Each of the two-digit displacement numbers will be segmented into two one-digit portions, a high-order portion and a low-order portion. The pulse streams that would result from repetitively adding each of the digits in the displacement numbers to itself are shown in table III.

TABLE III

| Four stream | Six stream | Eight stream | Three stream | Two stream | Seven stream |
|---|---|---|---|---|---|
| 0 | 0 | 0 | 0 | 0 | 0 |
| 0 | 1 | 1 | 0 | 0 | 1 |
| 1 | 0 | 1 | 0 | 0 | 1 |
| 0 | 1 | 1 | 1 | 0 | 0 |
| 1 | 1 | 1 | 0 | 1 | 1 |
| 0 | 0 | 0 | 0 | 0 | 1 |
| 0 | 1 | 1 | 1 | 0 | 0 |
| 1 | 0 | 1 | 0 | 0 | 1 |
| 0 | 1 | 1 | 0 | 0 | 1 |

One manner in which the data may be arranged in the high-order buffer 28 and the low-order buffer 34 of FIG. 2 is shown in table IV. Table IV does not show the entire word structure. Rather, it shows only the bits which are used to indicate increments of motion of the various axes to the machine tool motion controls. Although the first entry in the table in each buffer might normally be expected to be all zeros, it will be noted that table IV shows the last entry in each table to be the all zero entry. The reasons for this will become clear from the following operational description.

TABLE IV

| Address | H.O. buffer | L.O. buffer |
|---|---|---|
| 0 | 0 1 0 | 1 0 1 |
| 1 | 1 1 0 | 0 0 1 |
| 2 | 0 1 0 | 1 1 0 |
| 3 | 1 1 1 | 1 0 1 |
| 4 | 0 0 0 | 0 0 1 |
| 5 | 0 1 0 | 1 1 0 |
| 6 | 1 1 0 | 0 0 1 |
| 7 | 0 1 0 | 1 0 1 |
| 8 | 1 1 1 | 1 1 1 |
| 9 | 0 0 0 | 0 0 0 |

The information shown in table IV will be placed in the buffers 28 and 34 from the CPU 10 or high-order and low-order generating means by conventional means (not shown). The address counters 30 and 36 will be set to zero, also by conventional means (not shown). The word at location zero of the high-order buffer 28 will be placed in register 32 under control of the address counter 30. This first pulse from clock 46 will cause the contents of register 32 (high-order word zero) to be gated through OR circuit 40 to the machine tool motion control. This pulse will also, after a small delay introduced by element 48, change the contents of address counter 30 to cause the word at location 1 of high-order buffer 28 to be placed in register 32. In a similar manner, each of the first nine pulses from the clock 46 will cause a high-order word to be gated from register 32 to the machine tool motion control and will update address counter 30 to cause the next high-order word to be placed in register 32. After the ninth clock pulse nine high-order words (from buffer locations 0—8) will have been gated to the machine tool motion controls, address counter 30 will contain a 9 as the high-order buffer address, register 32 will contain the word that was stored in high-order buffer address 9, address counter 36 will contain the low-order address 0, and register 38 will contain the word stored at low-order buffer location 0. The 10th clock pulse will cause the frequency divider 50 to generate a pulse which gates the contents of register 38 through gate 44 to OR circuit 40. The contents of register 32 will also be gated by the 10th clock pulse to OR circuit 40 but, because register 32 contains all zeros at this time, it will be the contents of register 38 (the word stored in low-order buffer 34 at location 0) which will affect the machine tool motion controls. The 10th clock pulse will also set address counter 30 to zero and will set address counter 36 to one. Clock pulses 11–19(as well as 21–29, 31–39,...81–89, 91–99) will have exactly the same effect as did clock pulse 1–9. The 20th clock pulse will enable gate 44 to permit the contents of register 38 (the word at low-order buffer address 1) to pass to the machine tool motion control and will increment address counter 36. Similarly, the 30th, 40th,...80th and 90th clock pulse will cause the words from low-order buffer address locations 2, 3,...7 and 8 (that is, the third through the ninth word stored in buffer 34) to be gated to the machine tool motion controls. The 100th clock pulse will cause the last word in each of the buffers 28, 34 (both of which contain zeros) to be gated to the machine tool motion controls. The 100th clock pulse will also cause address counter 36 to return to zero causing a signal to be generated on line 54 to signal the CPU that the straight-line cut has been completed. The CPU 10 or high-order generating means will then supply a new high-order table to buffer 28 so that the next straight-line cut can begin and a new low-order table will be supplied to buffer 34. Well known interrupt and cycle-stealing techniques are used for communication between the buffers and the CPU.

In implementing this invention, many variations can be made to the apparatus shown in FIG. 2. For example, instead of arranging the interpolation tables with the "first" word in the "last" location of each buffer, the words could be arranged in their normal sequence. In this case, it would be desirable to initialize each of the address counters 30, 36 at "1" instead of at "0." Also, the data need not be sequentially arranged within the buffer. Then, each word would need to include the buffer address of he next word and the buffer output register (32 and/or 38) would need to be operatively connected to the appropriate address counter so that, upon readout from the register, the next address would be placed in the counter. As will be clear to those skilled in the art, various other data arrangements may be utilized. Another possible variation concerns the address counters 30 and 36. The two address counters could be replaced by a single double-size counter the low-order half of which would be used to address the high-order buffer 28 and the high-order half of which would be used to address the low-order buffer 34. For the case of the operational example given above, the double-size counter would have a capacity of two decimal digits. Each time that the low-order half of the counter returned to zero, the high-order half of the counter would be incremented by one, thereby providing proper addressing for the high-order buffer and the low-order buffer respectively. In the operational example given above, it was assumed that, after the completion of each straight-line cut, new interpolation tables would be supplied by the CPU before the occurrence of the next clock pulse. If the invention were to be implemented in such a manner that this were not feasible, it would then be necessary to inhibit the output of the clock to prevent the gating of erroneous information to the machine tool motion controls.

Another variation would be to have words from the low-order table inserted into the variable part of the high-order table at the appropriate times. In the embodiment shown in FIG. 2, all readouts to the machine tool motion controls would then be from the high-order table. Yet another variation would be to use a plurality of low-order tables. An alternative implementation of the invention utilizing the two last-mentioned variations is shown in FIG. 3.

Figure 3:
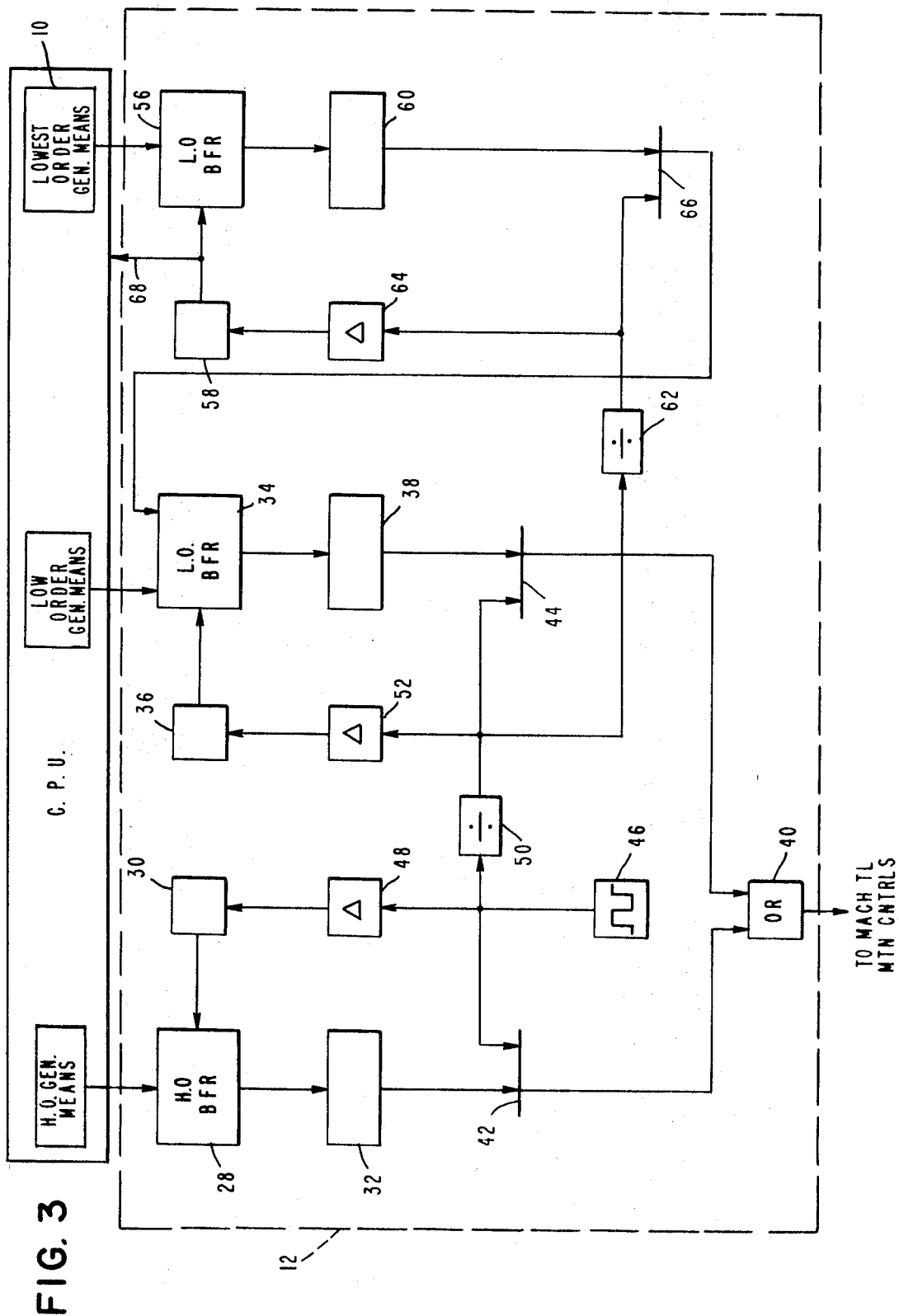
FIG. 3 shows an alternative embodiment of the apparatus shown in FIG. 2.

The primary additions shown in FIG. 3 are a second low-order buffer 56 with its associated address counter 58 and output register 60, an additional frequency divider 62 which is fed by the frequency divider 50 and which feeds a delay element 64 which feeds the address counter 58. The output of register 60 is gated through gate 66 to the first low-order buffer 34.

The apparatus shown in FIG. 3 would be used in situations where the interpolation is broken into three parts. For example, consider the situation where the number 8763 is being interpolated for one axis of the machine tool that is being controlled. One manner of segmenting the interpolation would be to place a table in high-order buffer 28 corresponding to the results of repetitively adding the number "8" to itself ten times; to place a table in low-order buffer 34 that would be generated by adding the number "7" to itself ten times; and placing in low-order buffer 56 a table that would be generated by repetitively adding the number "63" to itself 100 times. For this example, frequency divider 50 would be selected so as to produce one output pulse for each 10 clock pulses and frequency divider 62 would also be selected so as to produce one output pulse for each 10 input pulses (corresponding to one output pulse for each 100 clock pulses). The interaction between readouts from high-order buffer 28 and the first low-order buffer 34 will be the same as was described above. That is, for each 10 words read out of buffer 28, one word will be read out from buffer 34. The 100th clock pulse will cause words to be read out simultaneously from register 32 and 38 to OR circuit 40 and will also result in an output from frequency divider 62 which will enable gate 66 to cause the contents of register 60 (the word that was stored at location 0 in the second low-order buffer 56) to be placed in the first low-order buffer 34 at the location therein which contained the variable portion of the interpolation. If the contents of the first low-order buffer 34 are arranged in the manner described above with respect to FIG. 2, then the contents of register 60 would be read into address 9 of the first low-order buffer 34. The output of frequency divider 62 will, after a delay introduced by element 64, increment address counter 58. The above sequence will continue with each next 100th clock pulse causing the contents of register 60 to replace the variable word stored in buffer 34. The 10,000th clock pulse will cause address counter 58 to return to 0 resulting in a signal on line 68 which will signal the CPU that the straight-line cut has been completed and a new set of interpolation tables are needed.

As will be clear to those skilled in the art, the apparatus of FIG. 3 could equally well have been arranged so that data read from register 60 would pass to OR circuit 40 along with data read from registers 32 and 38. Also, the contents of the first low-order buffer 34 could have been used to alter the variable contents of high-order buffer 28 in the same manner that the contents of buffer 56 were used to alter the contents of buffer 34. The other variations referred to with respect to FIG. 2 could also be made with respect to FIG. 3.

Another significant point with respect to the apparatus shown in FIG. 3 concerns the number of times that each interpolation table is utilized. A certain amount of setup time is required to generate and store each table. When the table is used many times, the setup cost per use will be low. However, when there are several tables and the lowest-order table will be used only once, it may be more economical to generate the table entries as they are needed than to store the entire table. This will be especially true in situations where the lowest-order table would be accessed relatively infrequently.

Figure 4:
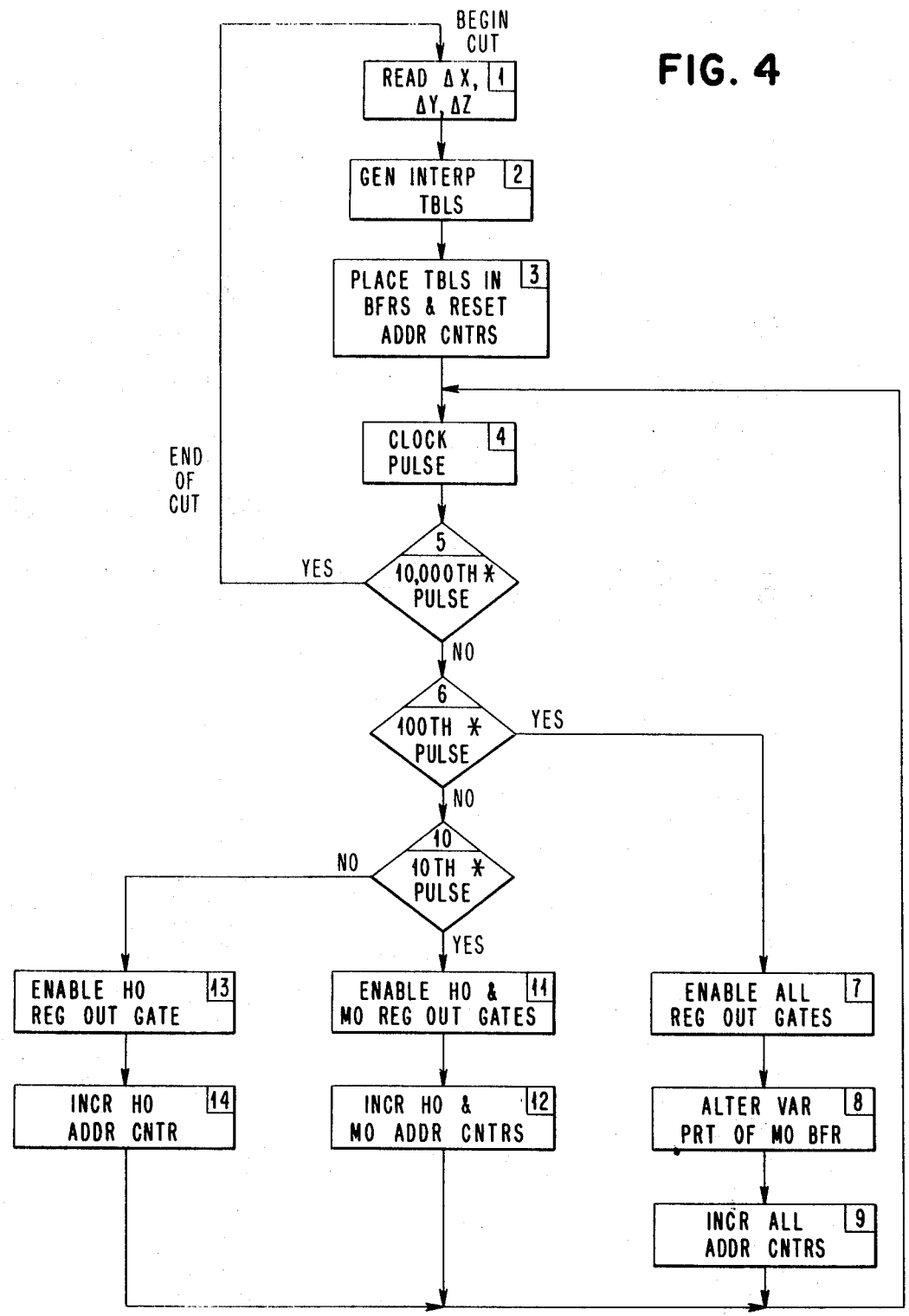
FIG. 4 is a flow chart illustrating the sequence of operations performed by the interpolation system of FIG. 3.

FIG. 4 is a flow chart illustrating the sequence of operations that are performed by the interpolation system of FIG. 3. As shown in boxes 1, 2 and 3, each straight-line cut is begun by reading the displacement data for each axis of the machine tool, generating the various interpolation tables, placing the tables in the appropriate buffers (28, 34 and 56 of FIG. 3) and setting the address counters to zero. A clock pulse (block 4) is used to initiate subsequent operation sequences. The occurrence of the 10,000th clock pulse (block 5) will result in the generation of a signal to the CPU (on line 68, FIG. 3) to indicate that the straight-line cut has been completed and that a new cut should begin. The 10,000th clock pulse will have caused the contents of registers 32 and 38 (FIG. 3) to be gated to OR circuit 40 but, because each of those registers will at that time have contained "0" bits in their axis-motion indicating positions, no improper motion of the machine tool will result when using the table arrangement described above. If the cut is not complete, but an integral number of hundreds of clock pulses have occurred (block 6), all register output gates 42, 44, 66 will be enabled (block 7) to permit data to pass from registers 32 and 38 to the OR circuit 40 and to permit the data contained in register 60 to alter the variable portion of the middle buffer 34 (MO BFR) as shown in block 8. All of the address counters 30, 36, 58 will then be incremented (block 9) and the system will await the next clock pulse (block 4). If the clock pulse was the 10th (or the 20th, 30th,...990th ,...4,060th, etc.) pulse (block 10) then the high-order and "-middle-order" (MO) output gates 42, 44 would be enabled (block 11) to pass data from registers 32 and 38 to the OR circuit 40, the high-order and middle-order address counters 30, 36 will be incremented (block 12) and the system will await the next clock pulse (block 4). If the tests indicated in blocks 5, 6 and 10 are all negative, then only the high-order register output gate 42 will be enabled (block 13) to permit data to pass from register 32 to the OR circuit 40, the high-order address counter 30 will be incremented (block 14) and the system will await the next clock pulse (block 4). As will be clear to those skilled in the art, although the block diagram of FIG. 4 suggests that the tests indicated in blocks 5, 6 and 10 are performed sequentially, they are actually performed substantially in parallel by the apparatus shown in FIG. 3.

The apparatus described above can be altered in many ways without departing from the spirit and scope of this invention. For example, although the above description indicated that all buffers are completely filled at the beginning of a straight-line cut, it would be feasible to build the various interpolation tables into the buffers while the cut is being executed. In this case, the highest-order buffer should be filled first because it will contain the data that will be needed first. After the highest-order buffer has been filled, the lower-order buffers could be successively filled with their various interpolation tables.

Another variation would be to make the high-order buffer large enough to hold two interpolation tables. Each half of the buffer would contain the fixed portion of the table (which would be identical in both halves) and the variable portion. Then, while data were being read from the first half of the buffer, the variable portion of the table in the second half could be altered (in the same manner that data from buffer 56 were used to alter data in buffer 34 of FIG. 3), and while data were being read from the second half of the high-order buffer, the variable portion of the first half could be altered.

One other variation that could be made relates to the manner in which the various interpolation tables are generated. Instead of generating the various n-pulse streams by repetitive addition, another suitable generation technique could be used. Once generated, the n-pulse streams could be stored for future use so that they would not have to be regenerated later.

Still another variation on the system would be to inhibit readout from the high-order buffer register when data are read from the low-order buffer register. If this implementation were used, the high-order buffer 28 shown in FIGS. 2 and 3 would need to contain only nine storage locations for the examples given above. If, when high-order readout was inhibited, the high-order address counter was also inhibited from advancing, the counter would have to be one which repeats itself after each sequence of nine addresses.

Yet another variation of the invention would be to have the last pulse in the various pulse streams constitute the variable portion. When pulse streams are generated by repetitive addition as described above, the first bit in the overflow stream will always be a "0" and the last bit will always be a "1". In the preferred embodiment, a high-order stream is generated by changing the first bit (0) to a 1. However, a lower-order stream could be generated from a higher-order stream by changing the last bit (which is normally a 1) to a 0. Referring again to tables I and II above, it may be seen that the 8-stream could be changed to a 7'-stream by changing the last "1" of the 8-stream to a 0. A system implemented in accordance with this variation would generally require that each table be arranged in a slightly different manner from that which has been presented above. However, the basic operation of the system would be substantially the same.

One other variation which will be clear to those skilled in the art is that the number to be interpolated could be broken up in many different ways. There could be a separate interpolation table for each digit of the number, or one or more of the interpolation tables could pertain to two or more of the digits in the displacement number.

FIXED TABLE WITH MASK

In the embodiment of this invention which uses a masking technique, there is provided a fixed table, each column of which contains a different pulse pattern. The pulse pattern in the columns of the table are combined through the use of masks to produce a desired pulse pattern for each machine tool axis. An example of such a fixed table is shown in table V.

TABLE V

| ADDRESS | CONTENTS |
|---|---|
| 0 | 0000 0 |
| 1 | 1000 0 |
| 2 | 0100 0 |
| 3 | 1000 0 |
| 4 | 0010 0 |
| 5 | 1000 0 |
| 6 | 0100 0 |
| 7 | 1000 0 |
| 8 | 0001 0 |
| 9 | 1000 0 |
| 10 | 0100 0 |
| 11 | 1000 0 |
| 12 | 0010 0 |
| 13 | 1000 0 |
| 14 | 0100 0 |
| 15 | 1000 1 |

In table V only the data which directly relates to pulse generation is shown. As has been mentioned above, additional data such as weighting factors and next address (if the table arguments are not accessed sequentially) might also be included in the table. The most significant characteristic of table V is that, by combining the entries in one or more of the first four columns of the table, any desired pulse sequence containing from one to 15 pulses may be generated. (The fifth column of the table entries are all "zero" except for the last "one." The "one" in the fifth column of the last table argument is used to signal the end of a pulse stream as is described below.) In accordance with this alternative embodiment of the invention, the table arguments are read out sequentially under control of a mask. The mask is set to permit only selected columns of the table to be read out. The outputs derived from the selected columns are OR'ed together to produce a desired pulse stream. It is further assumed in this embodiment that pulse streams of from one to 255 pulses may be generated. In the following discussion it will be convenient to use hexidecimal notation. Therefore, the number of pulses in a pulse stream may vary from 1 through EE pulses, where the hexidecimal "digits" A, B, C, D and E represent the decimal numbers 10, 11, 12, 13, 14 and 15 respectively.

The hexidecimal (hereinafter called "hex") number representing the number of pulses in a pulse stream will comprise no more than two digits. One mask is provided for each of the hex digits. In generating a pulse stream, the table will be read 17 times; 16 times under control of a high-order mask which contains the high-order hex digit; and once under control of a low-order mask which contains the low-order hex digit. This will result in generation of the desired number of pulses.

Figure 5:
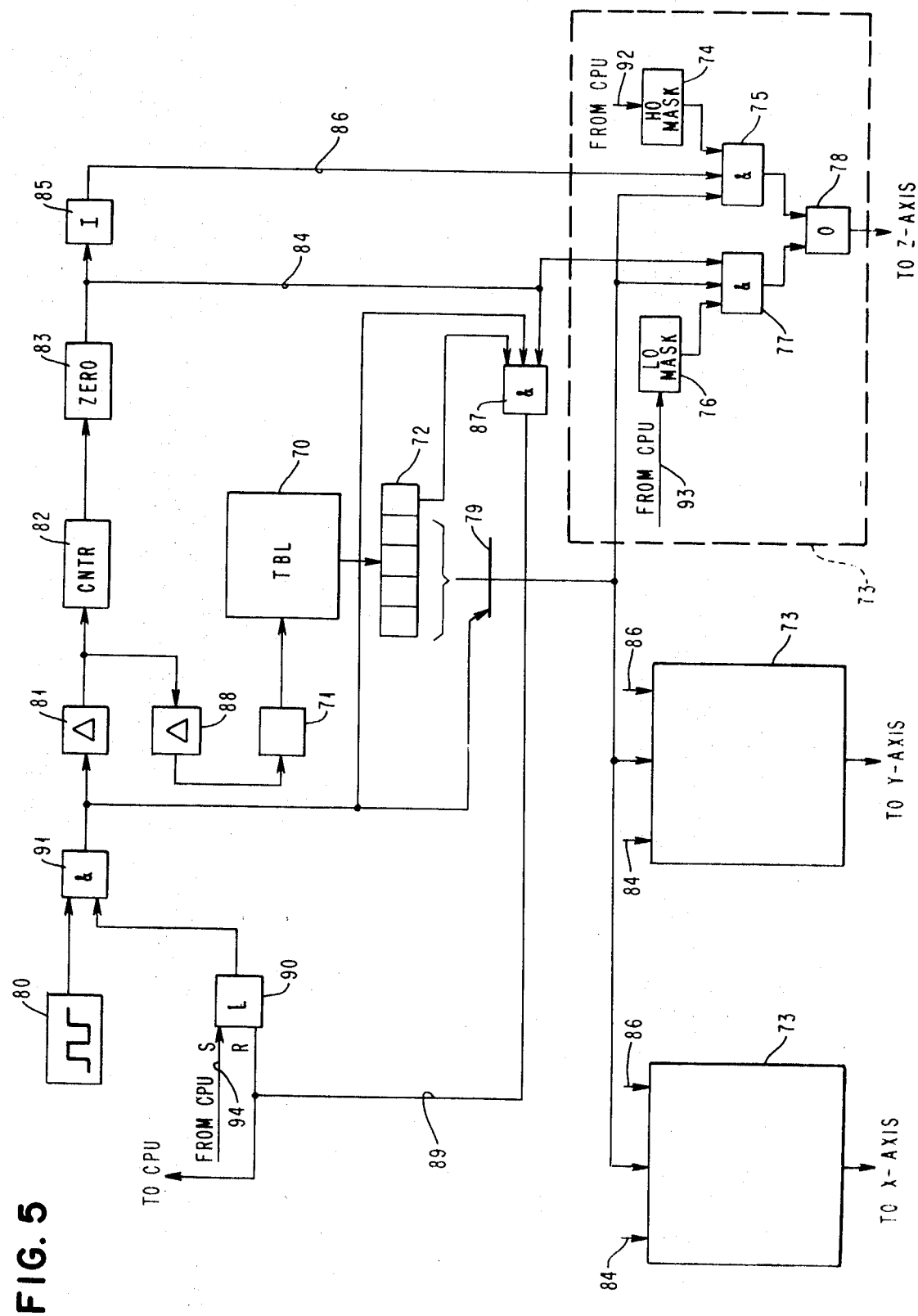
FIG. 5 shows another alternative embodiment of the invention.

A preferred embodiment of this invention utilizing the mask technique is shown in FIG. 5. The fixed table is held in a suitable storage medium 70 which has an associated address register 71 and and output register 72. The storage medium 70 is preferably a nondestructive readout type of storage but may be a standard destructive read out core storage or any other desired storage medium. For each axis to which pulses are being supplied there is a set of masking circuits 73 which comprise a high-order mask 74 which feeds an AND circuit 75, a low-order mask 76 which feeds an AND circuit 77, and an OR circuit 78 which receives its inputs from the AND circuits 75, 77 and which sends its outputs to an associated axis of the machine tool. Data from register 72 are gated to the masking circuits through gate 79 under control of pulses generated by a central clock 80. The clock pulses are utilized, after a small delay introduced by element 81 to update the contents of address register 71 and to increment a multistate device 82 which is used to select between a low-order mask and a high-order mask and which also is used to indicate the end of a pulse stream. Device 82 may be a counter or other suitable multi-state device which has a number of states that is one more than the number of words in the table 70. In this example, table 70 contains 16 entries, so device 82 should have 17 allowable 17 The counter 82 feeds a device 83 which emits a signal each time that counter 82 returns to its zero or initial state. This output signal is fed to AND circuit 77 via line 84 after each seventeenth readout from table 70 to enable the low-order mask 76. At all other times, an output signal from inverter 85 which is fed by the zero detection circuit 83 is sent via line 86 to AND circuit 75 to enable the high-order mask 74. The zero detection signal on line 84 is also fed to one input of an AND circuit 87 which receives its other inputs from the fifth location of register 72 and from the clock 80. The fifth location of register 72 will contain the bit that was read from the fifth column of the table contained in storage medium 70. Only after the 17th complete reading of the table will there be a coincidence of a "1" bit in the fifth position of register 72 and a zero signal from device 83. In order to prevent the read out of a new table argument before counter 82 assumes its zero state, it may be desirable to use an additional delay element 88 to slightly delay the updating of address register 71. After the table has been completely read out 17 times, a signal from AND circuit 87 will be sent via line 89 to the controlling CPU to request a new set of high-order and low-order masks. This signal may also be used to reset a latch 90 which will disable AND circuit 91 and prevent further clock pulses from causing erroneous readout before the new masks are supplied. When the new masks are supplied by a CPU (or other appropriate controlling device) to the high-order mask register 74 via line 92 and to the low-order mask register 76 via line 93, a signal will also be supplied to the set side of latch 90 via line 94 to again enable AND circuit 91 and allow operation of the system to continue. Delay elements 81 and 88 were included in the embodiment of FIG. 5 in order to eliminate possible race conditions which might be caused by premature changes of the counter 82, the address register 71 or the table output register 72. Those skilled in the art will recognize that the duration of the delays 81 and 88 (and in some cases a lack of necessity for the delays) will depend upon the specific kinds of circuitry that are used in any implementation of this invention. No delay is shown between the output of AND circuit 87 and the reset side of latch 90 because the inherent circuit delays in circuits 87, 90 and 91 will generally be sufficient to prevent the occurrence of a race condition in this part of the system. However, if a race condition should exist in a specific implementation, those skilled in the art will recognize that it could be cured by the introduction of a suitable delay which would delay the disabling of AND circuit 91.

The operation of the system shown in FIG. 5 can be most conveniently described through the use of a specific numerical example. Consider the example in which it is desired to generate a stream containing a number of pulses equal to the hex number 79 (which is equal to the decimal number 121). The high-order hex digit is expressed in binary notation 0111, and the low-order hex digit expressed in binary notation is 1001. Referring again to table V, it may be seen that a stream of seven pulses may be obtained by OR'ing together the second, third and fourth columns of the table; a stream of nine pulses may be obtained by OR'ing together the first and fourth columns of the table. Each of the mask registers 74, 76 shown in Fig. 5 contains four positions, each of which corresponds to one of the first four positions in the table output register 72. The controlling CPU will supply the binary equivalent (0111) of the high-order hex digit "7" to high-order mask 74 via line 92; it will supply the binary equivalent (1001) of the low-order hex digit "9" to low-order mask 76 via line 93. Counter 82 will be in the initial or "one" state and address register 71 will be in its initial or zero state. Register 72 will therefore contain the argument located at address zero of the table storage 70. The first clock pulse will enable gate 79 so that the contents of the first four positions of register 72 will be transmitted to AND circuits 75 and 77; because counter 82 is in its one state, a signal on line 86 will be presented to one input of AND circuit 75, so that the first table argument will be transmitted through OR circuit 78 to the associated axis of a machine tool under control of the high-order mask contained in register 74. Since the high-order mask register 74 contains a one in its second, third and fourth positions, the contents of the second, third and fourth positions of register 72 will be gated through the OR circuit 78 to the machine tool axis. After a small delay, the contents of counter 82 and address register 71 will each be incremented by one. For the next fifteen cycles of the system (cycles 2-16), the counter will not be in its zero state so a signal on line 86 will cause future transmissions of pulse information to be controlled by the contents of the high-order mask register 74. Because high-order mask register 74 contains a one in its second, third and fourth positions, clock pulses 2-17 will cause the contents of the second, third and fourth positions of register 72 to be gated through AND circuit 75 and then to be OR'ed together in OR circuit 78 for transmission to the associated machine tool axis. After the 16th clock pulse, counter 82 will be in its zero state, address register 71 will contain a zero and register 72 will contain the argument stored at location zero of the table storage 70. When the 17th clock pulse occurs, a signal on line 84 will be present at one input to AND circuit 77 and data from register 72 will be transmitted through AND circuit 77 under control of the low-order mask contained in register 76. Since the low-order mask register 76 contains a 1 in its first and fourth positions, the contents of the first and fourth positions of register 72 will be gated through OR circuit 78 to the machine tool axis. This situation will recur on cycles 34, 51, 68,...238, 255 and 272. At those times, the contents of address register 71 will have been 1, 2, 3,..., 13, 14 and 15, respectively. At all other times, gating of information from register 72 through the mask circuitry 73 will be under control of the high-order mask 74. At the start of the 272nd cycle, counter 87 will be in its zero state, address register 71 will indicate address 15 of the table storage, and register 72 will contain the word stored at location 15 (the last location) of table storage 70. Because counter 82 is in its zero state, there will be a signal on line 84 presented to AND circuit 77 so that the next transmission will be under control of the low-order mask register 76, and line 84 will also present a signal to one of the inputs of AND circuit 87. Because the last word in the table storage 70 contains a "1" in its fifth position, the fifth position of register 72 will also present an input to AND circuit 87. The 272nd clock pulse will cause information to be gated from register 72 under control of low-order mask register 76 to the associated machine tool axis. This clock pulse will also furnish the final enabling input to AND circuit 87 to produce a signal on line 89. This signal will alert the CPU to the fact that a new set of masks is required, and it will also reset latch 90 which will disable AND circuit 91 to disconnect the clock 80 from the system and prevent further transmissions until the new set of masks is supplied. The 272nd clock pulse will also reset counter 82 to its "1" state and will reset address register 71 to indicate address zero of the table storage medium 70. The system will then be ready to generate the next stream of pulses. (In order to provide additional assurance of proper operation of the system, it might be desirable for the CPU or other controlling unit to supply a signal to counter 82 and a signal to address register 71 to ensure that they have been properly reinitialized However, so long as the system is operating without a malfunction, this is not necessary.) After the 272nd cycle, each of the arguments stored in table storage 70 will have been read out 17 times; 16 times under control of the high-order mask and once under control of the low-order mask. For each complete read out under control of the high-order mask, seven output pulses will have been sent to the machine tool axis for a tool of 16×7=112 pulses; for the one complete read out under control of the low-order mask, nine pulses would have been sent to the machine tool axis. Therefore, the result has been the desired 121 pulses spread in a reasonably uniform manner throughout the time interval.

In the above discussion, the transmission of direction control information to the machine tool axis was ignored merely for purposes of ease of explanation. However, those skilled in the art will recognize that the necessary direction control information could be supplied in any of a variety of ways. One manner of supplying this information would be to add an additional location to each of the mask registers 74, 76. The additional location could be used to specify the desired direction of movement (e.g., "1" could mean motion in the positive and "0" could mean motion in the negative direction). The direction control information would have to be transmitted through the AND circuits 75, 77 and through the OR circuit 78 to the associated machine tool axis.

Those skilled in the art will recognize that various changes can be made in the fixed table and in the masks in any given specific implementation of this embodiment of the invention. One such change would be to use a plurality of low-order masks instead of the single low-order mask described above. For example, assume a system in which the number of pulses in any desired pulse stream is represented by three digits (where the term "digits" is used generically to refer to a numerical representation in any appropriate base, for example, base 16 (hexidecimal) in the previous example). In such a case, it might be desirable to use a table such as that shown in table V in conjunction with a high-order mask and two low-order masks. In this case, the first 272 cycles of the apparatus would be described above. On the 273rd cycle, one word from the table would be read out under control of the third (lowest-order) mask. Then another 272 cycles would be repeated as in the above example. At the conclusion of the pulse stream generation, each entry in the table would have been read out under control of the high-order mask (16) 2=256 times, each argument in the table would have been read out under control of the second mask (the middle-order mask) 16 times, and each argument in the table would have been read out under control of the lowest-order mask once. Such a system would be capable of generating a stream containing anywhere from one through 4,095 pulses during the given time interval.

Another variation would be to change the size of the table and of the masks. For example, the table could just as well have 32 entries (and each of the masks contain five positions instead of four). In this case, 32 successive table arguments would be read out under control of the high-order mask, followed by one table argument being read out under control of the low-order mask, followed by the next 32 successive table arguments being read out under control of the high-order mask, etc. This type of arrangement would enable the generation of any number of pulses from one through 1,023 during each complete series of 33 passes through the table. The significant point here is that the number of arguments in the fixed table (and correspondingly, the size of the mask register) may be varied as desired to suit a particular application or a particular implementation technique. It will generally be most convenient to have the number of entries in the table to be equal to some power of 2 because this will generally lead to easier and more efficient implementation. This type of implementation permits construction of the table in such a manner that the pulse indicating portion of each argument of the table (the first four columns under the heading "CONTENTS" of table V) contains no more than one "1". In this type of implementation, each time that a table argument is read under control of a mask, the circuitry need only detect the presence or absence of a "1" and need not be capable of counting the number of 1's that are present. However, if special circumstances were to make some other table arrangement desirable, the arrangement of the fixed table could be implemented in any convenient manner.

Yet another variation which will be clear to those skilled in the art would be to permit two or more complete series of passes through the table before requesting a new set of masks. Perhaps the simplest manner of modifying the system shown in FIG. 5 to accomplish this would be to insert a counter or other suitable multistate device at the output of AND circuit 87. This additional counter would signal the CPU that a new set of masks is required, and would reset latch 90, after a predetermined number of complete series of passes through the table had occurred.

As will also be clear to those skilled in the art, the specific apparatus shown for alternating between the high-order and the low-order masks (and for signalling the end of a complete series of passes through the table) are subject to many known variations.

Still another variation which would be of great practical value would be to have two sets of masks associated with each machine tool axis. In this case, during the time that the table arguments are being read out under control of one set of masks, the controlling CPU would supply an appropriate set of masks to the alternate mask registers. When the present series of passes through the table was completed, the output of AND circuit 87 could be used to transfer control to the alternate set of mask registers. Then, while processing continued, the CPU could supply the next set of masks to be first set of mask registers. Such an arrangement would allow processing to continue at all times without the interruption that would be caused by temporarily disconnecting the clock from the system.

In still another alternative embodiment of the invention, the technique shown in FIGS. 2 and 3 could be combined with that shown in FIG. 5. That is, one could use a plurality of fixed tables, each having its associated mask or set of masks. Also, the various tables need not all be of the same size. In such an arrangement, after each complete pass through the high-order table (or after each complete series of passes through the high-order table if more than one mask is associated with it), one argument would be read from the next lower-order table under control of its associated mask or masks. Then another pass (or series of passes) would be made through the high-order table followed by another reading of a single table argument from the next lower-order table. If there is more than one low-order table, then a complete pass (or series of passes) through the first low-order table would be followed by the processing of a single argument from the next lower-order table. This operation would continue until all arguments in the lowest-order table had been processed.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A numerically controlled machine system comprising:
 a source of motion control data, pulse generating means responsive to said data for generating a number of control pulses which represent said data, and positioning means moving in response to said control pulses; said pulse generating means comprising:
 high-order generating means responsive to a first portion of said motion control data for generating a first series of signals in a predetermined manner from said first portion;
 high-order storage means operatively connected to said high-order generating means for storing said first series of signals;
 first lower-order generating means responsive to a second portion of said motion control data for generating a second series of signals in a predetermined manner from said second portion;
 first lower-order storage means operatively connected to said first lower-order generating means for storing said second series of signals;
 transmission means connected between each of said storage means and said positioning means; and timing means operatively connected to said transmission means for causing signals from said first series of signals to be transmitted to said positioning means and for causing a signal from said second series of signals to be transmitted to said positioning means after a predetermined number of signals from said first series of signals have been transmitted thereto;

the signals transmitted to said positioning means comprising said control pulses.

2. The pulse generating means of claim 1 further comprising:

means connected between said timing means and each of said generating means for producing a signal to cause said generating means to generate new first and second series of signals.

3. The pulse generating means of claim 1 further comprising:

second lower-order generating means responsive to a third portion of said motion control data for generating a third series of signals in a predetermined manner from said third portion;

second lower-order storage means operatively connected to said second lower-order generating means for storing said third series of signals; and transmission means connected between said second lower-order storage means nd said positioning means, and operatively connected to said timing means for causing a signal from said third series of signals to be transmitted to said positioning means after a predetermined number of signals from said second series of signals have been transmitted thereto.

4. The pulse generating means of claim 1 further comprising:

second lower-order generating means responsive to a third portion of said motion control data for generating a third series of signals in a predetermined manner from said third portion;

second lower-order storage means operatively connected to said second lower-order generating means for storing said third series of signals;

transmission means connected between said second lower-order storage means and said first lower-order storage means, and operatively connected to said timing means for causing a signal from said third series of signals to be transmitted to and stored in said first lower-order storage means after a predetermined number of signals from said second series of signals have been transmitted thereto.

5. A numerically controlled machine system comprising a source of motion control data, pulse generating means responsive to said data for generating a number of control pulses which represent said data, and positioning means moving in response to said control pulses; said pulse generating means comprising:

high-order generating means responsive to a first portion of said motion control data for generating a first series of signals in a predetermined manner from said first portion;

high-order storage means operatively connected to said high-order generating means for storing said first series of signals;

first lower-order generating means responsive to a second portion of said motion control data for generating a second series of signals in a predetermined manner from said second portion;

first lower-order storage means operatively connected to said first lower-order generating means for storing said second series of signals;

first transmission means connected between said high-order storage means and said positioning means;

second transmission means connected between said first lower-order order storage means and said high-order storage means;

timing means operatively connected to said first transmission means for causing signals from said first series of signals to be transmitted to said positioning means, and operatively connected to said second transmission means for causing a signal from said second series of signals to be transmitted to and stored in said high-order storage means after a predetermined number of signals from said first series of signals have been transmitted to said positioning means;

the signals transmitted to said positioning means comprising said control pulses.

6. The pulse generating means of claim 5 further comprising:

means connected between said timing means and each of said generating means for producing a signal to cause said generating means to generate new first and second series of signals.

7. The pulse generating means of claim 5 further comprising:

second lower-order generating means responsive to third portion of said motion control data for generating a third series of signals in a predetermined manner from said third portion;

second lower-order storage means operatively connected to said second lower-order generating means for storing said third series of signals;

transmission means connected between said second lower-order storage means and said positioning means, and operatively connected to said timing means for causing a signal from said third series of signals to be transmitted to said positioning means after a predetermined number of signals from said second series of signals have been transmitted to said high-order storage means.

8. The pulse generating means of claim 5 further comprising:

second lower-order generating means responsive to a third portion of said motion control data for generating a third series of signals in a predetermined manner from said third portion;

second lower-order storage means operatively connected to said second lower-order generating means for storing said third series of signals;

transmission means connected between said second lower-order storage means and said first lower-order storage means, and operatively connected to said timing means for causing a signal from said third series of signals to be transmitted to and stored in said first lower-order storage means after a predetermined number of signals from said second series of signals have been transmitted to said high-order storage means.

9. A numerically controlled machine tool system comprising:

a source of numerical control data, data interpolation means operatively connected to said source, and positioning means operatively connected between said interpolation means and a machine tool so as to cause motion of a machine tool axis in response to pulses received from said interpolation means; said interpolation means comprising:

high-order generating means responsive to a first portion of said motion control data for generating a first plurality of signals in a predetermined manner from said first portion;

high-order storage means connected to said high-order generating means for storing said first plurality of signals;

high-order transmission means connected between said high-order storage means and said positioning means;

high-order addressing means connected to said high-order storage means for causing a high-order addressed signal stored in said high-order storage means to be transmitted to said high-order transmission means;

timing means operatively connected to said high-order transmission means and to said high-order addressing means for causing said high-order addressed signal to be transmitted by said high-order transmission means to said positioning means and to cause said high-order addressing means to address the next signal to be transmitted from said high-order storage means;

low-order generating means responsive to a second portion of said motion control data for generating a second plurality of signals in a predetermined manner from said second portion;

low-order storage means connected to said low-order generating means for storing said second plurality of signals;

low-order transmission means connected between said low-order storage means and said positioning means;

low-order addressing means connected to said low-order storage means for causing a low-order addressed signal stored in said low-order storage means to be transmitted to said low-order transmission means; and timing means operatively connected to said low-order transmission means and to said low-order addressing means for causing said low-order addressed signal to be transmitted by said low-order transmission means to said positioning means after a predetermined number of high-order addressed signals have been transmitted thereto, and to cause said low-order addressing means to address the next signal to be transmitted from said low-order storage means.

10. A numerically controlled machine tool system comprising:

a source of numerical control data, data interpolation means operatively connected to said source, and positioning means operatively connected between said interpolation means and a machine tool so as to cause motion of a machine tool axis in response to pulses received from said interpolation means; said interpolation means comprising:

high-order generating means responsive to a first portion of said motion control data for generating a first plurality of signals in a predetermined manner from said first portion;

high-order storage means connected to said high-order generating means for storing said first plurality of signals;

high-order transmission means connected between said high-order storage means and said positioning means;

high-order addressing means connected to said high-order storage means for causing a high-order addressed signal stored in said high-order storage means to be transmitted to said high-order transmission means;

timing means operatively connected to said high-order transmission means and to said high-order addressing means for causing said high-order addressed signal to be transmitted by said high-order transmission means to said positioning means and to cause said high-order addressing means to address the next signal to be transmitted from said high-order storage means;

low-order generating means responsive to a second portion of said motion control data for generating a second plurality of signals in a predetermined manner from said second portion;

low-order storage means connected to said low-order generating means for storing said second plurality of signals;

low-order transmission means connected between said low-order storage means and said high-order storage means;

low-order addressing means connected to said low-order storage means for causing a low-order addressed signal stored in said low-order storage means to be transmitted to said low-order transmission means; and timing means operatively connected to said low-order transmission means and to said low-order addressing means for causing said low-order addressed signal to be transmitted by said low-order transmission means to said high-order storage means and to be stored therein after a predetermined number of high-order addressed signals have been transmitted to said position means, and to cause said low-order addressing means to address the next signal to be transmitted from said low-order storage means.

11. A numerically controlled machine system comprising:

a source of motion control data, pulse generating means responsive to said data for generating a number of control pulses which represent said data, and positioning means moving in response to said control pulses; said pulse generating means comprising:

table storage means storing a plurality of pulse indicating arguments;

mask means;

means connected between said source of motion control data and said mask means for causing said mask means to represent said motion control data; and means connected between said table storage means and said mask means for transmitting said pulse indicating arguments to said mask means;

said mask means operating upon said pulse indicating arguments in a manner determined by said motion control data to generate said control pulses.

12. A numerically controlled machine system comprising:

a source of motion control data, pulse generating means responsive to said data for generating a number of control pulses which represent said data, and positioning means moving in response to said control pulses; said pulse generating means comprising:

table storage means storing in pulse indicating arguments;

high-order mask means;

low-order mask means;

means connected between said source of motion control data and each of said mask means for causing each of said mask means to represent a portion of said motion control data;

means connected between said table storage means and each of said mask means for transmitting said pulse indicating arguments to said mask means; and count indicating means connected to each of said mask means;

said count indicating means causing said high-order mask means to operate upon a predetermined number of said pulse indicating arguments to generate control pulses, said count indicating means then causing said low-order means to operate upon one of said pulse indicating arguments to generate a control pulse.

13. The apparatus of claim 12 wherein said predetermined number is equal to n.

14. The apparatus of claim 12 wherein said count indicating means, after causing said low-order mask means to operate upon one of said pulse indicating arguments, again causes said high-order mask means to operate upon said predetermined number of said pulse indicating arguments.

15. The apparatus of claim 14 further including ending means connected to said source of motion control data;

said ending means generating an end signal when said number of control pulses have been generated.

16. The apparatus of claim 15 wherein said ending means comprises:

means for detecting the concurrence of a first condition and a second condition;

said first condition being the operation by one of said mask means upon a predetermined one of said pulse indicating arguments;

said second condition being the presence of a predetermined count in said count indicating means.

17. A numerically controlled machine system comprising:

a source of motion control data, pulse generating means responsive to said data for generating a number of control pulses which represent said data, and positioning means moving in response to said control pulses; said pulses generating means comprising:

table storage means storing $n$ pulse indicating arguments;

high-order mask means;

low-order mask means;

timing means generating periodic timing signals;

means connected between said source of motion control data and each of said mask means for causing each of said mask means to represent a portion of said motion control data;

gating means connected between said table storage means and each of said mask means for transmitting said pulse indicating arguments to said mask means under control of said timing signals;

count indicating means being capable for counting said timing signals, an output of said count indicating means being connected to each of said mask means;

said count indicating means being capable of assuming at least $n+1$ different states including a predetermined state;

said count indicating means causing high-order mask means to operate upon successive ones of said pulse indicating arguments to generate control pulses when said count indicating means is not in said predetermined state, said count indicating means causing said low-order mask means to operate upon one of said pulse indicating arguments to generate a said pulse when saij count indicating means is in said predetermined state.

18. The apparatus of claim 17 further including end signaling means having a first input, a second input and an output;

means connected between said first input and said table storage means for detecting the transmission of a predetermined one of said pulse indicating arguments to one of said mask means;

means connected between said second input and said count indicating means for detecting the presence of said predetermined state;

said end signaling means generating at its output an end signal when the detected presence of said predetermined state concurs with the detected transmission of said predetermined one of said pulse indicating arguments; and means connected between said output and said source of motion control data for signaling said source to supply further motion control data to each of said mask means.

19. A numerically controlled machine system comprising:

pulse generating means responsive to stored data for generating a number of control pulses which represent said data, and positioning means moving in response to said control pulses; said pulse generating means comprising:

high-order storage means for storing a first series of signals based upon a first portion of motion control data;

first lower-order storage means for storing a second series of signals based upon a second portion of motion control data;

transmission means connected between each of said storage means and said positioning means; and timing means operatively connected to said transmission means for causing signals from said first series to signals to be transmitted to said positioning means and for causing a signal from said second series of signals to be transmitted to said positioning means after a predetermined number of signals from said first series of signals have been transmitted thereto;

the signals transmitted to said positioning means comprising said control pulses.

* * * * *